United States Patent [19]
Coulter

[11] 3,818,990
[45] June 25, 1974

[54] METHOD FOR CONTROLLING MOVEMENT OF LIQUIDS AND SOLIDS THROUGH A SUBTERRANEAN FRACTURE

[75] Inventor: Gerald R. Coulter, Duncan, Okla.

[73] Assignee: Halliburton Company, Duncan, Okla.

[22] Filed: Jan. 29, 1973

[21] Appl. No.: 327,343

[52] U.S. Cl.................. 166/280, 166/281, 166/294
[51] Int. Cl...................... E21b 43/26, E21b 33/138
[58] Field of Search ............ 166/280, 308, 281, 294

[56] References Cited
UNITED STATES PATENTS

| | | | |
|---|---|---|---|
| 3,127,937 | 4/1964 | McGuire, Jr. et al. | 166/280 |
| 3,155,159 | 11/1964 | McGuire, Jr. et al. | 166/280 |
| 3,235,007 | 2/1966 | Kern et al. | 166/280 |
| 3,241,613 | 3/1966 | Kern et al. | 166/280 |
| 3,249,158 | 5/1966 | Kieschnick, Jr. et al. | 166/280 X |
| 3,630,279 | 12/1971 | Fast et al. | 166/281 |
| 3,709,300 | 1/1973 | Pye | 166/280 |
| 3,757,862 | 9/1973 | Kern et al. | 166/281 X |

*Primary Examiner*—Stephen J. Novosad
*Attorney, Agent, or Firm*—John H. Tregoning

[57] ABSTRACT

A method for controlling movement of liquids and solids through a subterranean fracture comprising placing a bed of a propping agent in the lower portion of a vertical fracture in a subterranean formation; placing a substantially impermeable solid material in the fracture over the proppant bed; then, directing a fluid through the fracture at a pressure sufficient to displace at least a portion of the propping agent below the solid material without displacing the solid material, and to form a fluid flow channel between the solid material and the remaining portion of the proppant bed.

15 Claims, 2 Drawing Figures

PATENTED JUN 25 1974 3,818,990

METHOD FOR CONTROLLING MOVEMENT OF LIQUIDS AND SOLIDS THROUGH A SUBTERRANEAN FRACTURE

This invention relates to the production of hydrocarbons from subterranean formations, and more particularly, to hydraulic fracturing treatments.

The procedure of hydraulic fracturing was introduced to the petroleum production industry on a commercial basis about 25 years ago, and has been the subject of considerable innovation and improvement since that time. This process basically entails the use of hydraulic pressures exerted upon a subterranean formation to cause failure of the formation, and development of a crack or fracture therein whereby production from the formation may be increased. The increase in production is the result of the tendency of the fractures developed to increase the effective well bore radius. In most hydraulic fracturing treatments, a propping agent consisting of solid particulate material is utilized to form a proppant bed in the fracture so as to keep the fracture open after the applied hydraulic pressure has been removed.

A further extension of the hydraulic fracturing procedure involves retreatment of a previously developed fracture, or so-called re-fracing. Such retreatments become necessary when a well is not producing or accepting fluid for injection to the formation at a desired rate. Thus, a producing well may have declined to an uneconomic rate of production some time after the original fracturing treatment.

Several reasons exist for a well not continuing to produce at the desired rate for a period of time after an initial fracturing treatment has been carried out. Thus, the flow capacity of the fracture may not be sufficient to take full advantage of the formation flow capacity. The inadequate flow capacity of the fracture may be due to the fact that a relatively fine, low flow capacity proppant bed may have been placed in a formation which has a sufficiently high permeability that a high flow capacity proppant bed would have been much more effective. In some instances, the proppant bed may have initially had sufficient flow capacity for accommodating production from the formation, but such flow capacity of the proppant bed has become decreased with the passage of time due to breakdown and crushing of the propping agent, or the lodgement in the proppant bed of formation fines, or the development of a plugging scale within the proppant bed, tending to greatly reduce its flow capacity.

The present invention provides an improved method for retreating hydraulic fractures to improve production conditions in the fracture, and more particularly, to facilitate the removal of a propping agent from a fracture to facilitate the introduction of a new propping agent, or a redistribution of the old propping agent to new locations. Although the invention achieves perhaps its most important utility in the retreatment of fractures developed for hydrocarbon production in the manner described, it is to be understood that in its broadest concept and possible utility, the invention pertains generally to a method for controlling the movement of liquids and solids through a subterranean fracture.

Broadly described, the method of the present invention comprises initially placing a bed of a propping agent in the lower portion of a subterranean fracture. A substantially impermeable solid material is then positioned in the fracture immediately over the proppant bed, and then, at some subsequent time, a fluid is directed into the fracture at a sufficient pressure to displace at least a portion of the propping agent below the solid material without displacing the solid material. In this way, a fluid flow channel is developed between the solid material and the remaining, undisplaced portion of the proppant bed located below the solid material. The fluid is directed through this fluid flow channel for a selected period of time and at a selected pressure to remove a desired portion of the proppant bed from the fracture.

In the practice of the procedure of the invention for the retreatment of a fracture formed for enhanced hydrocarbon production, the solid particulate material utilized is preferably one of the conventional propping agents such as sand, glass beads, walnut hulls or the like, and location of the propping agent in the lower portion of the fracture is accomplished by conventional procedures.

The substantially impermeable solid material can be positioned on the upper side of the proppant bed by pumping a gellable material, such as a gel forming guar gum composition, into position in the upper portion of the fracture, and then allowing the composition to gel by a complexing mechanism or the like and form a relatively impermeable gel in that portion of the fracture filled thereby.

Subsequently to this time, water or an acid solution or other suitable, low viscosity fluid is directed into the fracture at a low pressure. The solid material performs a diverting function so that the propping agent or the like is displaced by the low viscosity fluid to the outer reaches of the fracture, and a fluid flow channel is developed between the lower side of the solid material and the bed of a propping agent in the lower portion of the fracture.

By the described technique, the solid particles in the proppant bed may be displaced more distantly with respect to a well bore or the point of origination of the fracture, and the propping agent is thereby redistributed in the fracture. By this method a low permeability proppant bed may be removed and replaced by a high permeability proppant bed to achieve production rejuvenation.

It has been found that, by selective control of the pressure at which the propping agent removal fluid is injected into the fracture, the described technique can result in the formation of a flow channel between the proppant bed and the substantially impermeable solid material, and that the flow of fluid through this channel can therefore be made at any selected velocity. Furthermore, a reduction in the rates and pressures of injection can be achieved by this selective control. Also, after displacement and/or replacement of the old propping agent, the solid material may be removed, and a new propping agent may be placed in the area previously occupied by the solid material in order to receive production from pay intervals which may have existed in the area covered by the solid material during the propping agent displacement stage of the process.

The method of the invention also has applicability to initial or primary fracturing treatments. Thus, when well conditions dictate that propped fractures of substantial length are necessary in order to achieve the desired rate of hydrocarbon production, the method of the invention can be advantageously used to achieve high flow rates of a displacing fluid through the channel formed between the solid material and the initially placed propping agent so as to sweep a portion of the proppant bed back into the outer reaches of the elongated fractures at relatively low fluid pressures.

Finally, the method of the invention can also be used in acidizing treatments. Here, propping agent is flushed to the back or outer reaches of the fracture, using the diverting technique of the invention. Additional propping agent, if needed, may then be placed after displacement of the original propping agent from under the solid material. Concurrently with the placement of the additional propping agent, an acidizing solution can be pumped through the flow channel developed beneath the solid material. With formations which are highly acid soluble, the resultant etching on the fracture face in the flow channel area beneath the solid material would result in high flow capacity leading back to the proppant bed. Where the formation is not highly acid soluble, the acidizing treatment may nevertheless function to increase the permeability along the face of the flow channel beneath the gel and, if desired, this flow channel may then be subsequently filled with a new propping agent more accommodated to the increased permeability adjacent the flow channel.

Additional advantages of the invention will become apparent as the following description of preferred embodiments of the invention is read in conjunction with the accompanying drawings in which.

Figure 1:
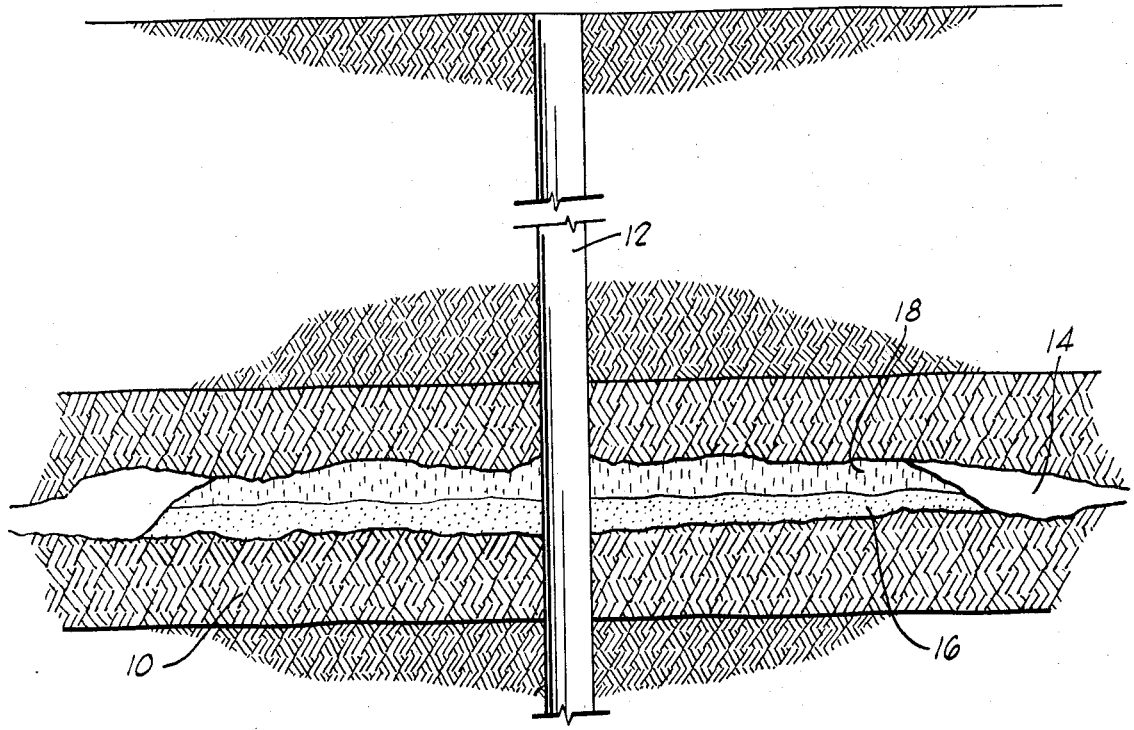
FIG. 1 is a diagrammatic cross sectional view through a subterranean situs illustrating a hydrocarbon producing zone which has been fractured to increase productivity, and in which a solid material has been placed above a proppant bed.

In a broad sense, the method of the invention assumes the prior development of a vertical fracture in a subterranean formation, and the prior filling of at least a portion of the vertical dimension of some part of that fracture with a solid particulate material, such as a conventional propping agent known to function as such in the hydrocarbon production technology. Given this context, the invention then comprises the steps of first plugging and obstructing the portion of the fracture over this bed of particulate material with a relatively impermeable solid material such as a gel or the like, followed by the displacement of at least a portion of the propping agent from the bed beneath the gel. In many cases, the method can desirably be extended through another step, i.e., that of replacing the displaced proppant bed with another proppant bed. Finally, the method can be extended yet further to include final steps of (a) removal of the gel or other solid material, followed by (b) replacement of the solid material with a permeable proppant bed susceptible to fluid flow therethrough.

Since the methods and techniques for the creation of fractures in producing subterranean formations are well known in oil and gas production technology, no detail will here be set forth as to fracturing techniques, and the desiderata which determine the manner in which the fracture is produced, or its particular physical characteristics and geometry. The same is also true of the propping agent placement techniques, and the identification in great detail and comprehensive fashion of the types of propping agents previously investigated and found to be useful in subterranean fracturing procedures. It is pointed out, however, that the method of the present invention has utility extending to, and including, some situations where the requisites of a functioning propping agent do not appertain, but rather, where the only desiderata is the placement, and control of the location, of the propping agent in a subterranean fracture. Thus, for example, the method of the invention can be beneficially employed in depositing propping agents in fractures developed, or existing naturally, in water producing formations for the purpose of filtering water produced via such fractures. The shallow depth at which such fractures are located may be such that the pressure withstanding characteristics of conventional propping agents employed in deep well petroleum production are of no criticality.

As has been indicated in the prior discussion of this invention, the general objective of the procedure contemplated by the invention is to remove or relocate propping agents disposed, for one reason or another, in a particular location within a subterranean fracture, and generally so deposited therein that a void or open space exists within the fracture above such propping agent. It has frequently been found difficult to satisfactorily achieve the removal or redistribution of propping agents by the use of relatively high viscosity fluids because a tendency exists, when this type of removal or redistribution is carried out, to widen or enlarge the fracture by breaking down the surrounding formation. Such change in the fracture geometry is often not desirable. The same problem may occur when it is attempted to sweep out the propping agent or redistribute it by the use of high velocities and flow rates which generally entail substantially increased pressure on the solid removing fluid, and consequent failure of the surrounding formations with attendant fracture geometry alteration.

The present invention, which depends upon the placement of a solid material above the propping agent or other solid particulate material to be redistributed, contemplates the use of various types of solid materials. Compositions having the capability of gelling, or becoming semisolid impermeable bodies by thixotropic development, or other setting mechanism, are well known in the oil production technology. Thus, for example, an aqueous solution of guar gum can be introduced into a subterranean fracture under controlled conditions of fluid flow rate, formation temperature and fluid pressure to permit the establishment of an impermeable, semisolid body of the guar gum gel within the fracture. Similarly, a number of other materials capable of in situ gellation can be utilized. Such materials include, for example, gellable aqueous compositions containing water soluble cellulose derivatives such as hydroxyethylcellulose, carboxymethylcellulose, carboxymethylhydroxyethylcellulose, methylcellulose or sulfopropylcellulose or water soluble synthetic polymers such as polyacrylamide, polymethacrylamide, polyacrylic acid or sodium polyacrylate; gellable hydrocarbon compositions; or hydraulic cement.

It should be pointed out that in its most flexible or versatile form, the invention contemplates the utilization, as the solid material, of a gel or other plugging material which can be "broken" to facilitate its removal at a later time after it has served its plugging function. Again, the means of breaking the various types of gels often used for their plugging or diverting function in the production of hydrocarbons is presently well understood, and need not be detailed here.

Prior to considering specific examples of the use of the invention, and the considerations which may dictate the exact manner of its usage for the solution of various problems of propping agent redistribution in subterranean fractures, a final comment on the knowledge presently possessed by the hydrocarbon production technology is needed. The amount of oil in place in a subterranean formation, the bottom hole temperature and pressure at the locus of the fracture, the fracture geometry, the amount of the fracture filled with a proppant bed, the portion of the net pay interval over which the fracture extends, the flow capacity and geometry of distribution of a proppant bed within a fracture during the original fracturing treatment, the fracture closure pressure, and the present fracture flow capacity, all can be measured or calculated by known methods, and these parameters used to determine the need for redistribution of the propping agent originally located in the fracture, and the type of replacement proppant which may be desirable.

If, for example, it is determined from published propping agent transport equations and other available mathematical tools, that the relative capacity of the propped fracture is low, and that a large portion of the net pay zone was originally propped, then the old propping agent should be removed, or at least redistributed, and a new, high flow capacity proppant bed placed in the fracture in place of the old proppant bed. It is known that, generally, propping agents can be placed and moved from one location to another in a fracture by entraining the propping agent in a fluid pumped into the fracture, and that by control of the injection rate, propping agent size and density, and carrier fluid viscosity and density, all in relation to the fracture width and height, the propping agent may be caused to settle out of the carrier fluid at a desired location, and may be built up in a bed at that location. The bed of propping agent can be built up to an equilibrium height by controlling such parameters as the carrier fluid injection rate and viscosity.

At times, after the equilibrium height of a proppant bed is reached at a given injection rate, attempts to then move the proppant from the bed to a location further away from the injection point in the fracture by increasing the injection rates of the carrier fluid may be impractical due to the pressure tolerances of the tubular goods used for conveying the carrier to the location of the fracture. Increased injection rates with their attendant increased pressure can also result in undesirable failure of the formation attended by undesirable enlargement of the fracture. Prior investigations have also indicated, as previously pointed out herein, that attempts to transport or displace a propping agent, such as sand, from a deposited proppant bed by replacing the original transport fluid with a displacement fluid of a higher viscosity is relatively ineffective and that little of the proppant bed was displaced by this method.

Figure 2:
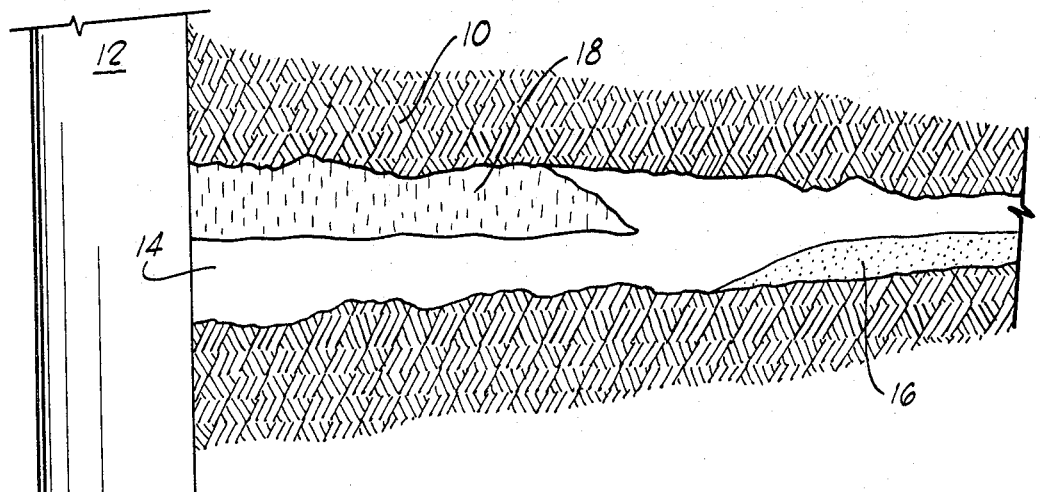
FIG. 2 is a diagrammatic detail view showing the character and appearance of the fracture after the propping agent has been displaced from beneath the solid material.

A diagrammatic illustration of the main aspects of the practice of the present invention is presented in FIGS. 1 and 2 of the drawing. As shown in FIG. 1, an oil bearing subterranean formation 10 is traversed by a well bore 12. Projecting radially outwardly from the well bore 12 into the formation 10 is a fracture 14 which has been produced by conventional fracturing techniques for the purpose of enhancing the production of oil from the formation. After creation of the fracture 14 in the formation 10, portions of the fracture are packed with a propping agent 16 which, as illustrated, forms a proppant bed in the lower portion of the fracture. Subsequently during the production history of the formation, it is determined by appropriate tests and measurements that the proppant bed 16 located in the fracture 14 is not performing effectively, and it is therefore deemed desirable to remove this proppant bed by displacement into the radially outer reaches of the fracture, and replace the old proppant bed with a new propping agent having better permeability and oil flow characteristics. In order to replace the old proppant bed 16, the present invention is utilized. Thus, a gel-forming composition 18 is pumped into the fracture 14 and allowed to gel in the space over the proppant bed 16 to form a plug or diverting material at that location.

After establishing the solid material 18 over the proppant bed 16, water or other suitable fluid is directed through the fracture to displace the proppant bed from under the solid material in the manner hereinbefore described. The appearance of the fracture after this process is completed is generally that diagrammatically illustrated in FIG. 2 of the drawing. Here, it will be seen that the propping agent 16 has been displaced into the leading end or radially outer portion of the fracture 14, and has there been settled out of the displacing fluid as the velocity of the fluid drops after passing through the restricted space beneath the gel 18. A new proppant may then be relocated under the gel.

In tests of the invention which have been conducted, sand is used as a widely employed, typical propping agent, and water is used as the transport or carrier fluid employed both in moving the gel-forming composition into the desired locus, and in redistributing the sand. The gel-forming composition utilized, again because of its availability and widespread usage, is an aqueous solution of guar gum.

The following examples, together with the preceding explanation of the drawings, will illustrate the manner of use and the effectiveness of the invention in the redistribution of solid particles within a fracture.

EXAMPLE 1

A laboratory model simulating a subterranean fracture is made by placing two clear, synthetic resin panels in vertically extending, parallel relation with a spacing from each other of 0.25 inch to form a simulated fracture. The panels are each 1 foot high and 10 feet long. A bed of 20–40 mesh sand is established within the simulated fracture by pumping tap water having the sand entrained therein into the fracture at an initial fluid velocity of 58.2 feet per minute. At this velocity, a sand bed is finally established which is 5½ inches in height at its highest point, and approximately 5 feet long. After the establishment of the described sand bed, continued pumping of tap water over the bed at the same rate does not result in any significant movement or displacement of the sand particles, thus indicating that an equilibrium height of the sand bed has been achieved.

EXAMPLE 2

Having established a sand bed of the dimensions described in Example 1 within the described laboratory model, a high viscosity fluid (as compared to tap water) is prepared by mixing 70 pounds of guar gum per 1,000 gallons of tap water. A total fluid volume of 20 gallons is prepared having an apparent viscosity of 70 cps., based upon a 300 RPM Fan Viscometer reading at 75° F. The viscous aqueous guar gum composition is pumped through the simulated fracture at a velocity of 60 feet per minute. Again, no movement or displacement of the sand particles is noted.

The results of the simulated fracture runs carried out in Examples 1 and 2 indicate that it is difficult to remove or redistribute a proppant bed by the use of a displacement fluid having increased viscosity as compared to the carrier fluid initially employed in establishing the bed.

EXAMPLE 3

A simulated fracture model is prepared using a board of ¾-inch thickness covered on one side with a metal sheet to act as one side of the vertical fracture, and using a ¾-inch sheet of clear synthetic resin as the other side of the fracture. The width of the simulated fracture, as determined by the distance between the board and sheet is 0.25 inch. Proppant (20–40 mesh sand) is poured into the fracture to build up the desired proppant bed. The upper edge of the fracture is then sealed with Tygon tubing. The bed established in this way can be varied in height and length for each test. After establishment of the approximate desired bed height, water is pumped through the fracture to settle and pack the proppant bed, establish the equilibrium height of the proppant bed and remove air from the system.

A solution of 70 pounds of guar gum per 1,000 gallons of water is then pumped into the fracture to displace the water over the sand bed and fill the fracture. The guar gum solution is then allowed to stand statically over the sand bed for a period of time sufficient to complex. After the guar gum composition has complexed to a semisolid gel, tap water is pumped into the fracture at a very low initial rate. Visual observation of the model reveals that a very small amount of the water passed through the gel located in the upper portion of the fracture, whereas the major portion of the water passed through the sand bed in the lower portion of the fracture. At the initial low rate, it is observed that sand particles in the sand bed soon begin to reorient in the direction of flow, with such re-oriented particles being displaced from the top of the bed. As the water flow is continued, more of the sand particles are moved along the top of the sand bed, until a small flow channel is perceived to develop in the top of the sand bed. The injection rate of the water is gradually increased, so that the velocity of the water in the small flow channel and across the top of the sand bed is correspondingly increased to displace additional particles from the top of the sand bed. However, when the flow rate is substantially increased, the complexed gel system begins to flow, and eventually is washed out of the simulated fracture.

EXAMPLE 4

The fracture model described in Example 3 is modified by coating the inside surfaces of the simulated fracture with a rubber cement containing 20–40 mesh sand. This technique gives a textured surface adjacent the fracture which is more representative and simulative of an actual subterranean formation. A sand bed is then established in the fracture in the manner described in Example 3. An aqueous guar gum solution is formed by mixing 120 pounds of guar gum per 1,000 gallons of tap water, thus increasing the guar gum concentration over that described in Example 3. The aqueous solution of guar gum is then pumped into the fracture and allowed to stand statically over the sand bed for a period of time sufficient to complex. The water is then pumped at a low rate into the fracture. It is observed that none of the water penetrates or traverses the complexed gel, and none of the gel is flushed out of the system during the test, even when the flow rate of the tap water is increased very substantially.

At the initial low flow rate of the water through the fracture, the sand particles are seen to reorient, and a minute flow channel is observed to develop along the top of the sand bed. Upon continued pumping of the tap water at the same low flow rate, the pump pressure is observed to decrease concurrently with the continued development and enlargement of the flow channel in the top of the sand bed. With the passage of time, the displacement of said particles and enlargement of the flow channel decrease in rate, and the pressure of the water begins to stabilize. The approach of an equilibrium status of the proppant bed is thus indicated.

The injection rate is increased at this time, accompanied by corresponding increase in pump pressure. This results in a further increase in the size of the flow channel, and a decrease in the height of the sand bed. The experience of stabilization of pump pressure and stabilization of the flow channel size and bed height is experienced several times, indicating that for a given flow rate, a given sand bed equilibrium height exists. It is perceived that by continually increasing the rate of flow of the water through the fracture system, substantially all of the sand can ultimately be swept out of the fracture from beneath the overlying gel. The same result can, of course, also be realized by periodically increasing the pump pressure after it stabilizes.

The tests described in Examples 1–4 clearly indicate that the method of the invention is effective to facilitate the removal of solid particles, such as a proppant bed, from one location to a more remote location within a vertical fracture having a horizontal extension within a subterranean formation. The technique of gel placement which is at the heart of the process of the invention effectively decreases the cross sectional area of the fracture which is open to fluid flow, and thereby decreases the injection rate which is required to remove the proppant bed. This in turn decreases the total pump pressure required for proppant bed removal, and will in some instances facilitate propping agent removal where the pressures otherwise required would exceed the pressure tolerance of the fluid carrying portions of the pump-to-fracture fluid conveyance system used in the well.

In some instances, the steps of the present invention must be carried out in stages. Thus, with some types of relatively weak formations, the increased flow rate and attendant increased pressure which are necessary to reduce the proppant bed to the desired height, or to completely sweep out the propping agent, cannot be utilized because such increased pressure will cause the formation to fail, and will result in undesirable alteration in the fracture geometry, or will result in rupture of the conveying pipe. A staged diverting technique can then be utilized in which the proppant bed is swept down to some equilibrium height at a flow rate and pressure of the removal fluid which does not exceed the formation failure pressure. At this time, a gel-forming solution is again pumped into the fracture to fill up that portion of the fracture above the stabilized proppant bed and below the initially placed gel. After the gel in the intermediate space has formed, the removal fluid is again pumped through the fracture at a relatively low initial flow rate and pressure, and an additional amount of propping agent is removed and the proppant bed further lowered. This series of steps can be repeated until the proppant bed is completely removed from the fracture.

Various refinements of the basic process which has been described herein may be carried out. Thus, the flow rates and type of fluid used for displacing propping agent from their original locus within the fracture will determine whether the particles are distributed into a fluid producing portion of the formation located further outwardly from the well bore, or whether the propping agent is swept even further outwardly beyond the drainage radius of the formation. The latter distribution is desirable if the old proppant bed has insufficient flow capacity, or tends to build up to a relatively high bed in the portion of the fracture behind the gel, which portion nevertheless is adjacent a highly productive part of the formation. Even where it is necessary to locate a part of the old propping agent in the outer reaches of a fracture extending through a net pay thickness of the formation, if the total height of the redistributed proppant bed can be maintained below about 10 percent of that net pay thickness adjacent the fracture, very little decrease in production will be experienced from this type of redistribution of the old, improperly functioning proppant bed. One technique which can be employed for decreasing the bed height of the displaced proppant bed is to employ a relatively higher viscosity fluid at high pressures at some point in the displacement process to cause an increase in the fracture width. Such an increase in fracture width will result in an overall reduction in the height of the redistributed proppant bed, so that by this technique, the height of the bed adjacent the pay zone can be reduced to less than one-tenth of the total fracture height.

In a further development of the invention, a new propping agent can be located in the fracture at selected locations therealong after the original proppant bed has been displaced or redistributed. It may be intially observed that if the carrier fluid used to carry the new propping agent into the fracture is passed through the fracture at the same velocity as that which was required to remove all of the old propping agent from beneath the gel, the new propping agent will not undergo any significant deposition under the gel. Rather, the new propping agent will be deposited at some point outwardly from the gel where the velocity of the carrier fluid becomes reduced due to the increased cross sectional dimension of the fracture. The injection rates necessary to carry the new propping agent a desired distance from the well bore can be calculated. The amount of propping agent entrained, and the time of pumping required to build a proppant bed of desired height at these selected locations can also be calculated.

After this part of the retreatment is completed and new proppant bed located in the outer reaches of the fracture, the injection rate of the carrier fluid may be decreased and propping agent injection then continued until the volume of the fracture under the gel or other solid material is filled with a new, higher flow capacity proppant bed. Finally, the portion of the fracture containing the gel should be considered. If the gel is covering a portion of the net pay interval, then the gel should be ultimately broken and proppant bed placed in this area by conventional techniques. In this connection, it is possible that the gel itself have suspended therein, propping agent which will contribute to this placement of proppant bed in the volume occupied by the gel prior to breaking.

Although certain preferred embodiments of the method of the invention have been herein set forth in order to illustrate the basic principles of the invention, various modifications and changes in the steps described, and in the materials used, may be effected without departure from such basic principles. Changes and innovations of this type are therefore deemed to be within the spirit and scope of the invention unless a fair and reasonable interpretation of the appended claims requires their exclusion.

What is claimed is:

1. A method for controlling the movement of liquids and solids through a subterranean fracture comprising:

placing a bed of solid particles on the bottom surface of at least a portion of the subterranean fracture;

placing a substantially impermeable solid material in the fracture over the bed of solid particles; and subsequently passing a displacement fluid into the fracture to selectively remove solid particles from the top of the bed progressively downwardly with the concurrent formation of a fluid flow channel of increasing size between said bed and said impermeable material.

2. The method defined in claim 1 wherein said substantially impermeable solid material is placed in the fracture by pumping a gellable composition into the fracture over the bed of solid particles; and forming a gel in situ over the bed of solid particles.

3. The method defined in claim 1 wherein said solid particles are propping agents to prevent closure or the dimensional reduction of said fracture.

4. The method defined in claim 1 and further characterized to include the step of:

placing solid particles of a material differing from said removed solid particles in the space left under said impermeable solid material after said selective removal of said first mentioned solid particles.

5. The method of retreating a propped subterranean fracture extending horizontally into a hydrocarbon producing formation from a well bore, comprising the steps of:

placing a substantially impermeable, flow obstructing material between the proppant bed in at least a part of the fracture and the top of the fracture;

displacing at least a portion of the proppant bed disposed below said flow obstructing material; then placing a new proppant bed in the fracture in place of the displaced proppant bed.

6. The method defined in claim 5 wherein said flow obstructing material is a gel.

7. The method defined in claim 6 wherein said gel is an aqueous guar gum gel.

8. The method defined in claim 6 wherein said gel contains a propping agent.

9. The method defined in claim 6 and further characterized to include the further steps of:
breaking the gel and
removing it from over the new proppant bed.

10. The method defined in claim 9 and further characterized as including the step of:
filling the space occupied by the gel before its removal with a propping agent.

11. The method defined in claim 5 wherein said displaced portion of proppant bed is displaced into a portion of said fracture which is further removed in a radial direction from said well bore than the original location of said displaced portion of the proppant bed.

12. The method defined in claim 5 and further characterized as including the step of:
removing said flow obstructing material after said new proppant bed has been placed.

13. The method defined in claim 5 wherein said portion of the displaced proppant bed is displaced by directing a liquid at a constant flow rate through and over said proppant bed until the propping agent beneath said flow obstructing material is disposed in a bed of constant height as said liquid flow is continued at said constant flow rate.

14. The method of displacing particulate material partially obstructing a subterranean fracture comprising:
blocking the fracture around the particulate material with a liquid impermeable solid material to increase the liquid pressure drop through the fracture at the location of the particulate material; then passing a liquid into the fracture to sweep the particulate material away from the solid material.

15. A method of displacing a proppant bed outwardly in a fracture comprising:
placing an impermeable gel in the fracture over the proppant bed to be displaced;
flowing a displacing liquid through the fracture to open a space between the gel and proppant bed by displacing outwardly in the fracture a portion of propping agent which is located relatively near to the gel;
filling said space with additional impermeable gel; then
flowing additional displacing fluid through the fracture to displace additional propping agent outwardly in the fracture.

* * * * *